US012560781B2

(12) United States Patent
Shiu et al.

(10) Patent No.: US 12,560,781 B2
(45) Date of Patent: Feb. 24, 2026

(54) COUPLED LENS STRUCTURE FOR MIXED/AUGMENTED REALITY SYSTEM

(71) Applicant: NATIONAL CENTRAL UNIVERSITY, Taoyuan (TW)

(72) Inventors: Ying-Shun Shiu, Taoyuan (TW); Guan-Wei Huang, Taoyuan (TW); Jun-Yi Yu, Taoyuan (TW); Wen-Hsin Sun, Taoyuan (TW); Wei-Chia Su, Taoyuan (TW); Wen-Kai Lin, Taoyuan (TW); Shao-Kui Zhou, Taoyuan (TW); Yuan-Yan Liang, Taoyuan (TW); Ching-Cherng Sun, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 296 days.

(21) Appl. No.: 18/402,360

(22) Filed: Jan. 2, 2024

(65) Prior Publication Data

US 2025/0138283 A1     May 1, 2025

(30) Foreign Application Priority Data

Oct. 26, 2023    (TW) ................................ 112141109

(51) Int. Cl.
*G02B 13/00*        (2006.01)
*G02B 9/34*        (2006.01)
(52) U.S. Cl.
CPC ............. *G02B 13/004* (2013.01); *G02B 9/34* (2013.01)

(58) Field of Classification Search
CPC .................................. G02B 13/004; G02B 9/34
See application file for complete search history.

(56) References Cited

FOREIGN PATENT DOCUMENTS

| | | | | | |
|---|---|---|---|---|---|
| CN | 1824618 A | * | 8/2006 | ............... | G02B 7/02 |
| NL | 2020987 A | * | 12/2019 | ......... | G02B 13/0085 |

OTHER PUBLICATIONS

English Translation of NL 2020987 A (Year: 2018).*
English Translation of CN 1824618 A (Year: 2006).*

* cited by examiner

*Primary Examiner* — Lucy P Chien
(74) *Attorney, Agent, or Firm* — Juan Carlos A. Marquez; Marquez IP Law Office, PLLC

(57)        ABSTRACT
A coupled lens structure for a mixed/augmented reality system includes: a lens tube; a first lens with a first aspherical light input surface coupled to a lens-tube light input surface; a second lens with a second spherical light input surface optically coupled to a first spherical light output surface of the first lens; a third lens with a third spherical light input surface optically coupled to a second aspherical light output surface of the second lens; and a fourth lens with a fourth spherical light input surface optically coupled to a third spherical light output surface of the third lens and a fourth spherical light output surface coupled to a lens-tube light output surface. The coupled lens structure has volume of 2.1-3 cc, a lens-tube outer diameter of 12-13.5 mm, and a full angle of view not greater than 30 degrees, featuring an effective reduction in volume and weight.

13 Claims, 6 Drawing Sheets

100

COUPLED LENS STRUCTURE FOR MIXED/AUGMENTED REALITY SYSTEM

BACKGROUND OF THE INVENTION

1. Technical Field

The present invention relates to a coupled lens structure for a mixed/augmented reality system. More particularly, the invention relates to a coupled lens structure for use in a mixed reality (MR) or augmented reality (AR) eyeglass system.

2. Description of Related Art

Mixed reality (MR) smart glasses are eyeglass products that incorporate virtual reality (VR) and augmented reality (AR) technologies. They can add virtual images or information to a user's real-world field of view, thereby bringing the user into a virtual environment.

In an MR smart glass system, the contents displayed by the display device are typically projected through coupled lenses to a light guide, which in turn projects the contents to a still camera, a video camera, or the human eye. A recent development trend is toward the manufacture of increasingly light and compact AR/MR smart glasses and headsets, so it has been an important technical issue to develop coupled lenses that are smaller and more lightweight than the existing ones.

SUMMARY OF THE INVENTION

The present invention provides a coupled lens structure for a mixed/augmented reality system and aims to solve the problem that the conventional coupled lens structures are too bulky and too heavy to be effectively and conveniently integrated into an MR glass system.

The present invention provides a coupled lens structure for a mixed/augmented reality system, wherein the coupled lens structure includes a lens tube, a first lens, a second lens, a third lens, and a fourth lens. The lens tube has a lens-tube outer diameter and a lens tube length. The lens tube further has a lens-tube light input surface and a lens-tube light output surface. The first lens has a first aspherical light input surface and a first spherical light output surface, wherein the first aspherical light input surface is coupled to the lens-tube light input surface. The second lens has a second spherical light input surface and a second aspherical light output surface, wherein the second spherical light input surface is optically coupled to the first spherical light output surface. The third lens has a third spherical light input surface and a third spherical light output surface, wherein the third spherical light input surface is optically coupled to the second aspherical light output surface. The fourth lens has a fourth spherical light input surface and a fourth spherical light output surface, wherein the fourth spherical light input surface is optically coupled to the third spherical light output surface while the fourth spherical light output surface is coupled to the lens-tube light output surface. The lens-tube outer diameter and the lens tube length define a volume in the range from 2.1 to 3 cc. The lens-tube outer diameter is in the range from 12 to 13.5 mm. The full angle of view of the coupled lens structure is not greater than 30 degrees.

Implementation of the present invention at least produces the following advantageous effects:

1. The volume of the coupled lens structure is effectively reduced.

2. The total weight of the coupled lens structure is effectively reduced.

3. The coupled lens structure can be integrated into an MR glass system more effectively and more conveniently than its prior art counterparts.

BRIEF DESCRIPTION OF THE DRAWINGS

The structure and the technical means adopted by the present invention to achieve the above and other objectives can be best understood by referring to the following detailed description of a preferred embodiment and the accompanying drawings, wherein.

DETAILED DESCRIPTION OF THE INVENTION

Figure 1:
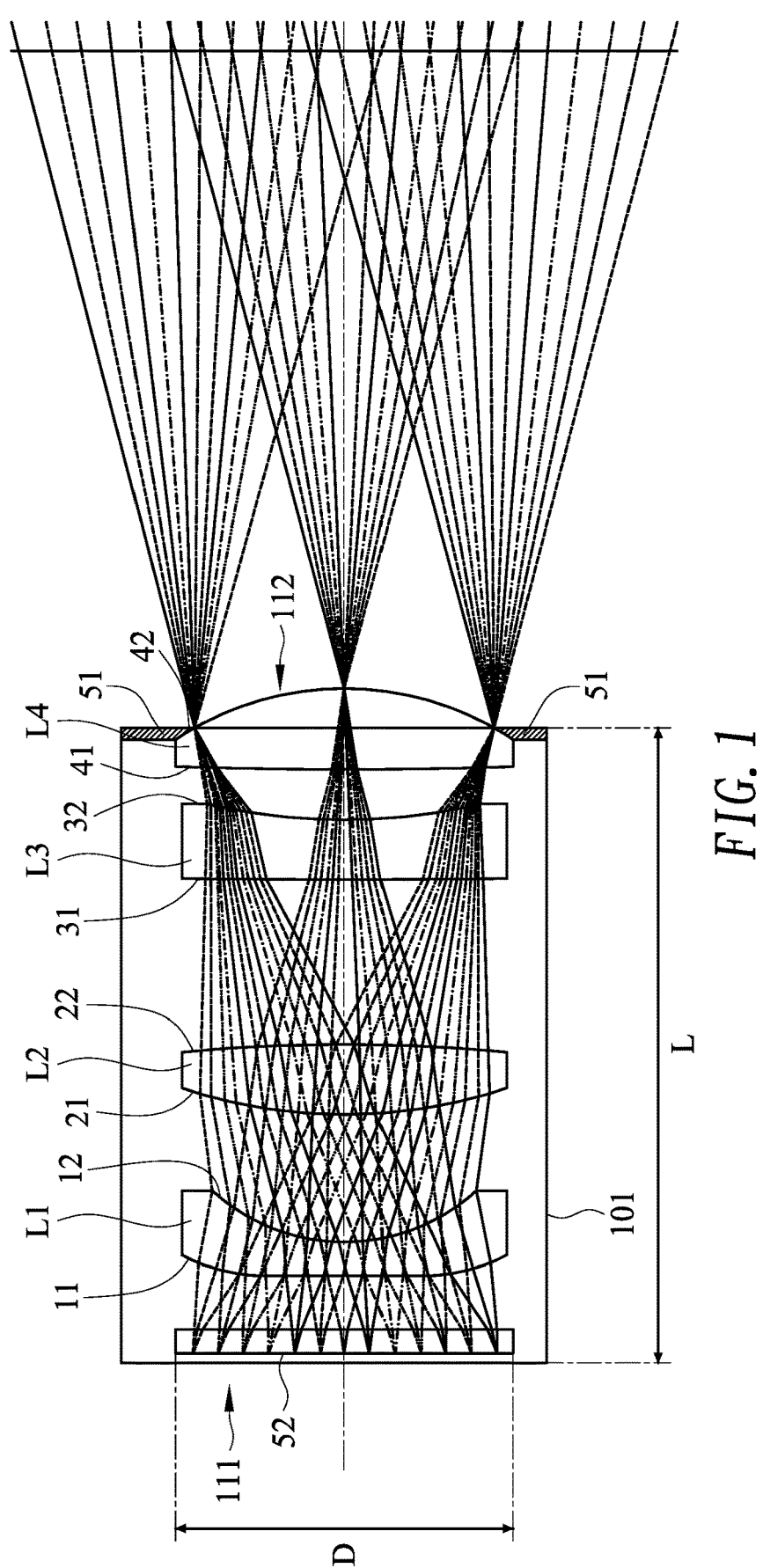
FIG. 1 shows the coupled lens structure for a mixed/augmented reality system according to an embodiment of the invention.

As shown in FIG. 1, the coupled lens structure 100 for a mixed/augmented reality system according to an embodiment of the present invention includes a lens tube 101, a first lens L1, a second lens L2, a third lens L3, and a fourth lens L4. The first lens L1, the second lens L2, the third lens L3, and the fourth lens L4 are all provided in the lens tube 101.

The lens tube 101 is the main supporting structure of the coupled lens structure 100 for a mixed/augmented reality system. The lens tube 101 may be a hollow tubular structure with a circular cross section and has a lens-tube outer diameter D, a lens tube length L, a lens-tube light input surface 111 (i.e., the object-side surface), and a lens-tube light output surface 112 (i.e., the image-side surface).

The first lens L1 has a first aspherical light input surface 11 and a first spherical light output surface 12. The first aspherical light input surface 11 is coupled to the lens-tube light input surface 111; in other words, the first lens L1 is provided at a position adjacent to the lens-tube light input surface 111.

The second lens L2 has a second spherical light input surface 21 and a second aspherical light output surface 22. The second spherical light input surface 21 is optically coupled to the first spherical light output surface 12; in other words, the second spherical light input surface 21 is provided at a position adjacent to the first spherical light output surface 12.

The third lens L3 has a third spherical light input surface 31 and a third spherical light output surface 32. The third spherical light input surface 31 is optically coupled to the second aspherical light output surface 22; in other words, the third spherical light input surface 31 is provided at a position adjacent to the second aspherical light output surface 22.

The fourth lens L4 has a fourth spherical light input surface 41 and a fourth spherical light output surface 42. The fourth spherical light input surface 41 is optically coupled to the third spherical light output surface 32, and the fourth spherical light output surface 42 is coupled to the lens-tube light output surface 112; in other words, the fourth spherical light input surface 41 is provided at a position adjacent to the third spherical light output surface 32, and the fourth spherical light output surface 42 is provided at a position adjacent to the lens-tube light output surface 112.

When the lens-tube outer diameter D is designed within the range from 12 mm to 13.5 mm, and the lens tube length L is designed to be 19 mm, the coupled lens structure 100 for a mixed/augmented reality system has a volume in the range from 2.1 to 2.7 cc. Therefore, the coupled lens structure 100 for a mixed/augmented reality system can make a lens assembly whose volume is in the range from 2.1 to 3 cc. Moreover, the coupled lens structure has a full angle θ of view not greater than 30 degrees.

One of the first lens L1, the second lens L2, the third lens L3, and the fourth lens L4 has an effective diameter greater than or equal to 7.65 mm (≥7.65 mm) and less than or equal to 9 mm (≤9 mm).

The first lens L1 or the second lens L2 may be a lens made of a polymer material, and the third lens L3 or the fourth lens L4 may be a glass lens. Moreover, the first lens L1 is a lens with a negative dioptric power value, the second lens L2 is a lens with a positive dioptric power value, the third lens L3 is a lens with a positive dioptric power value, and the fourth lens L4 is a lens with a positive dioptric power value.

An aperture stop 51 may be additionally provided between the lens-tube light output surface 112 and the fourth spherical light output surface 42, and a protective lens 52 may be additionally provided between the lens-tube light input surface 111 and the first aspherical light input surface 11. The aperture stop 51 may have a focal ratio (i.e., f-number) in the range from 1.5 to 2.5. The protective lens 52 may be a planar glass lens.

Figure 2:
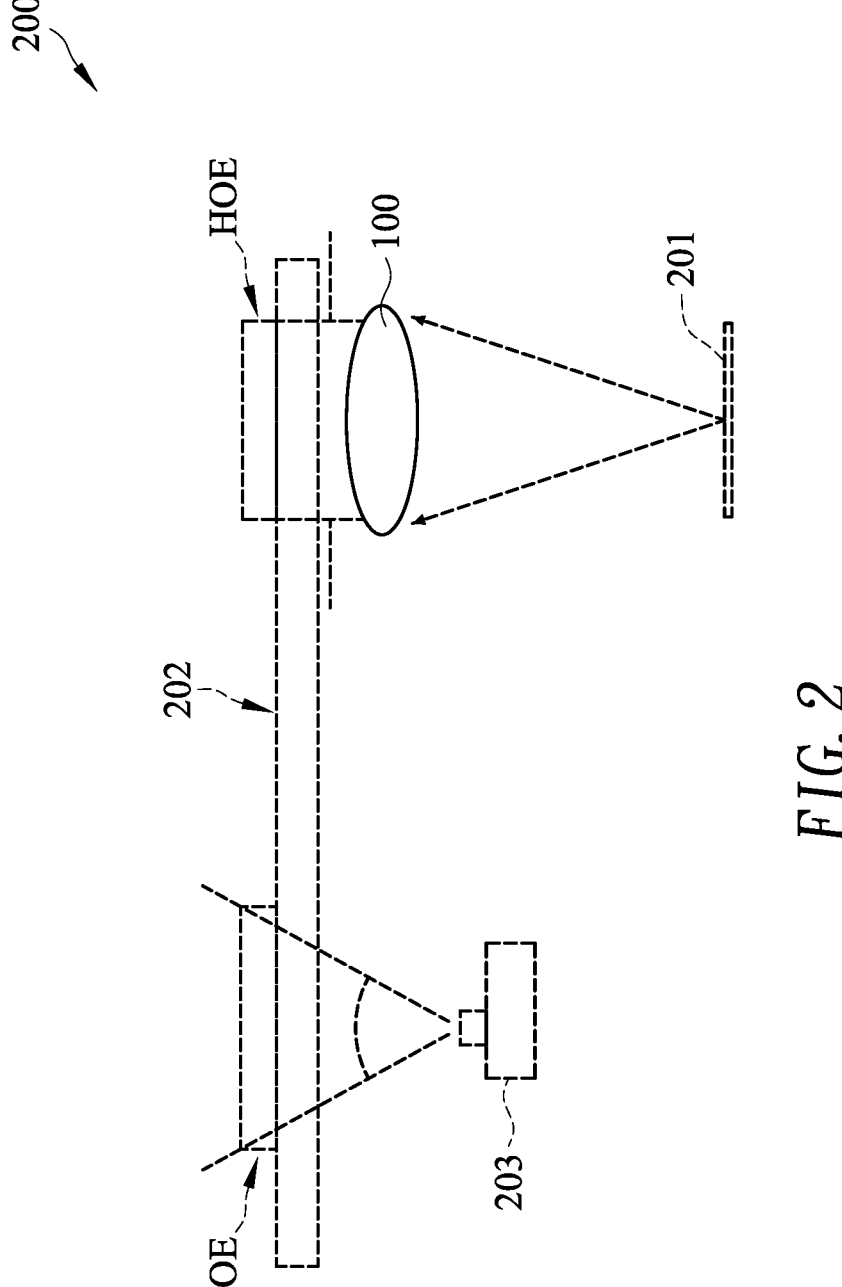
FIG. 2 shows an application example of the coupled lens structure for a mixed/augmented reality system according to the invention.

FIG. 2 shows an example in which the coupled lens structure 100 for a mixed/augmented reality system is applied to a mixed reality glass system 200. The contents displayed by the display device 201 are projected through the coupled lens structure 100 for a mixed/augmented reality system to a light guide 202 that includes holographic optical elements (HOE), in order for the light guide 202 to project the contents to a still camera, a video camera, or the human eye 203.

To better demonstrate the advantageous effects of this embodiment, optical design software CODE V was used with the following wavelength settings: the Long wavelength at 656.72 nm, the Ref wavelength at 587.56 nm, and the Short wavelength at 486.12 nm. Optical property simulations were subsequently performed with a full angle of view not greater than 30 degrees, and the simulation results are shown in FIG. 3 to FIG. 6 and explained below.

Figure 3:
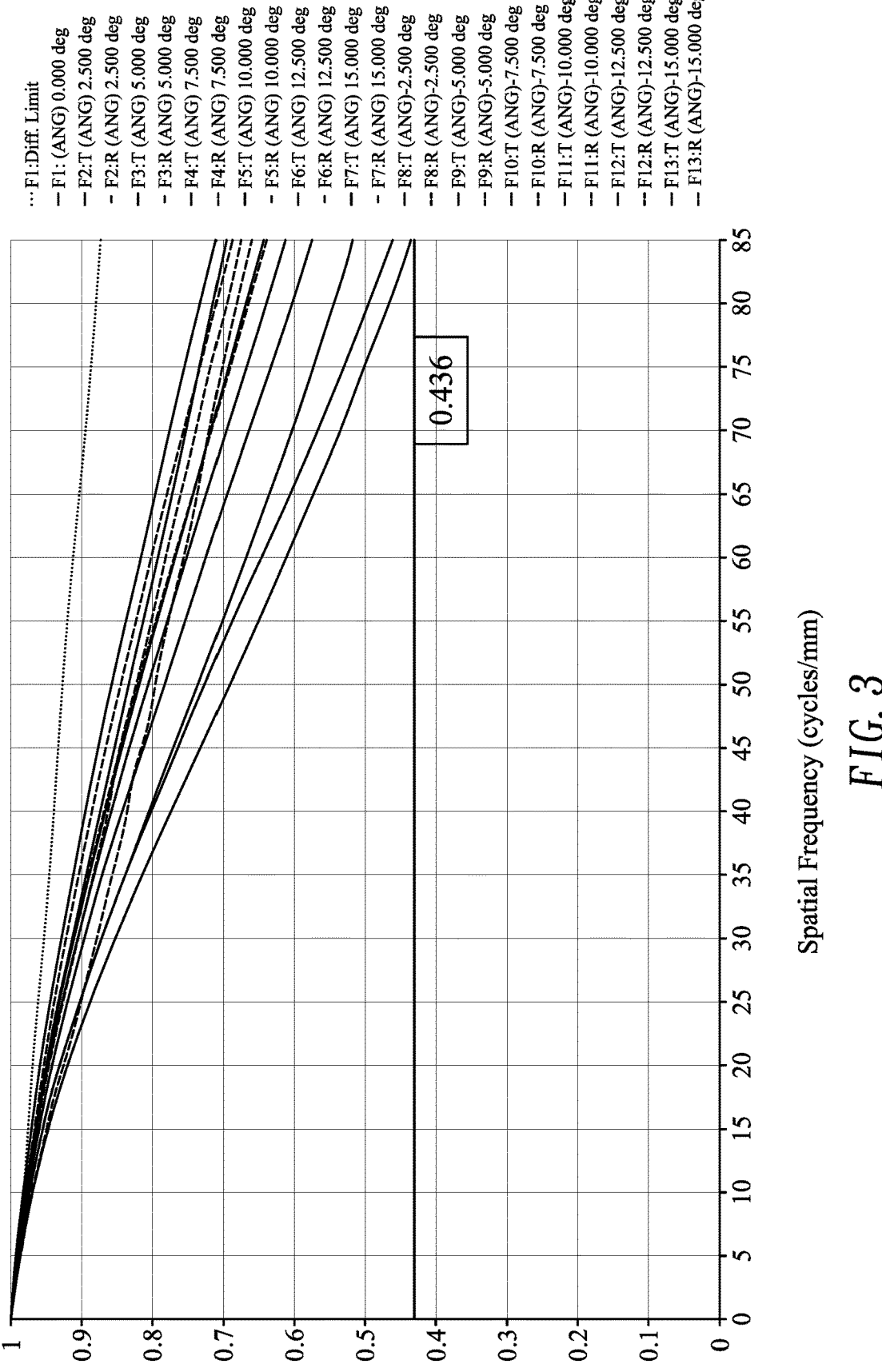
FIG. 3 shows modulation transfer function curves.

FIG. 3 shows modulation transfer function (MTF) curves of the coupled lens structure 100 for a mixed/augmented reality system, with F1-F13 indicating fields of view that are increased at an increment of 2.5 degrees. The curves are divided into the tangent (T)-direction curves and the radial (R)-direction curves. It can be seen in FIG. 3 that when the spatial frequency is lower than or equal to 85 cycles/mm, the modulation value of the modulation transfer function (MTF) corresponding to each field of view is greater than or equal to 0.436.

Figure 4:
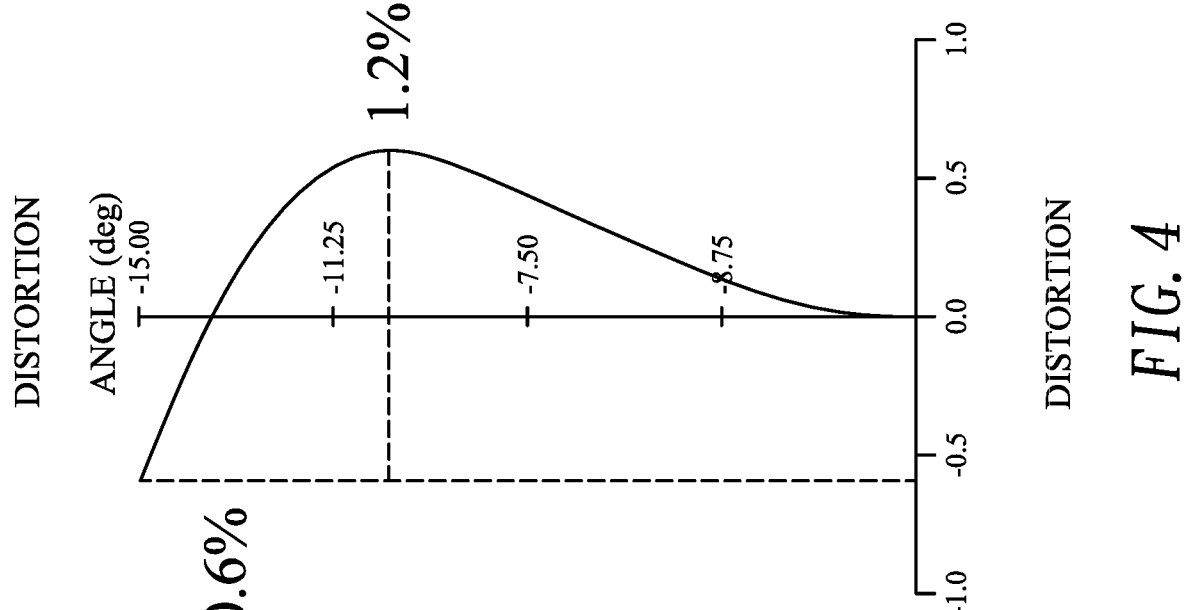
FIG. 4 shows a distortion curve.

FIG. 4 shows a distortion curve of the coupled lens structure 100 for a mixed/augmented reality system. The absolute value of optical distortion is less than or equal to 0.6% (i.e., |optical distortion|≤0.6%), and the absolute value of TV distortion is less than or equal to 1.2% (i.e., |TV distortion|≤1.2%).

Figure 5:
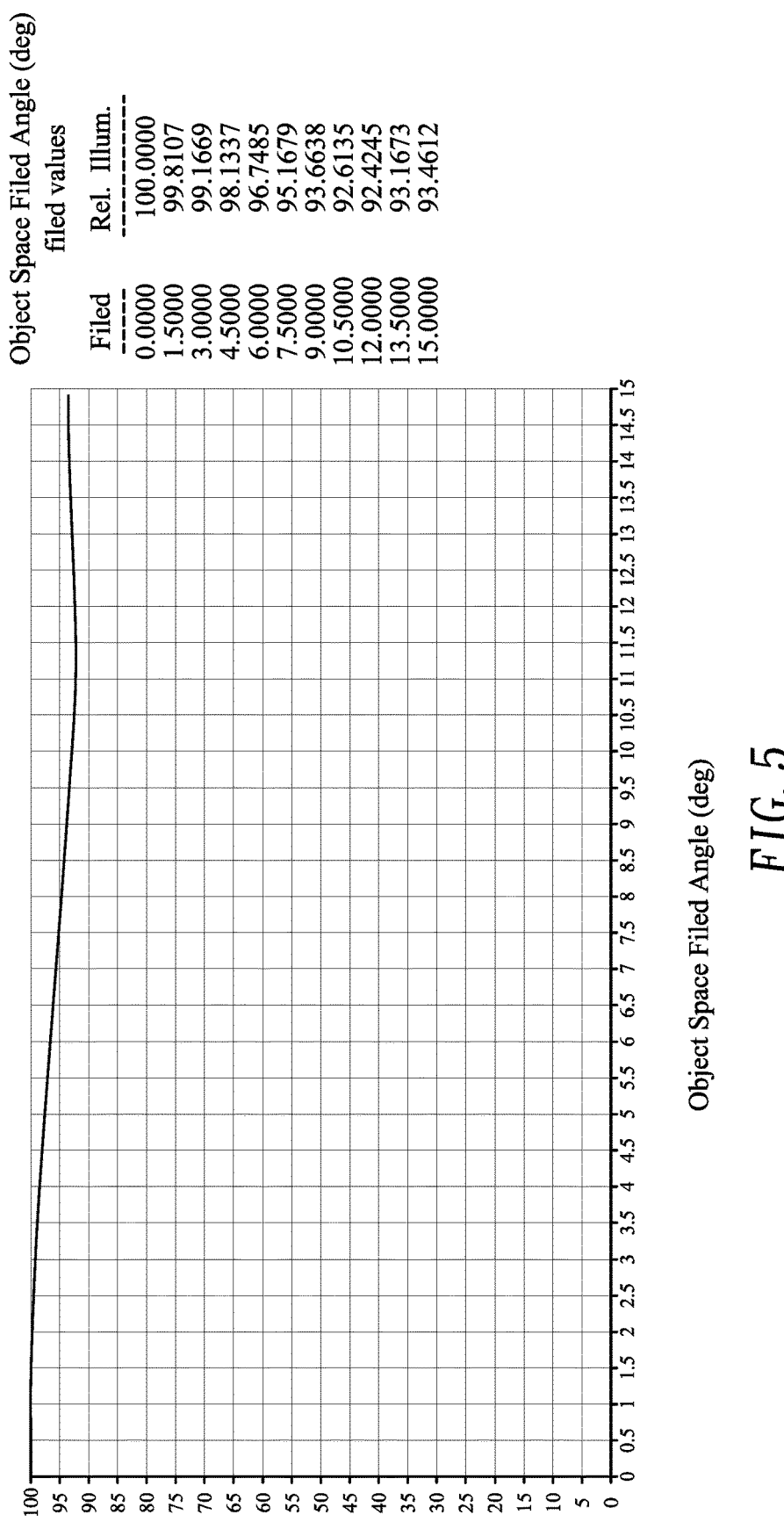
FIG. 5 shows a relative illumination curve.

FIG. 5 shows a center-to-edge relative illumination (RI) curve of the coupled lens structure 100 for a mixed/augmented reality system. It can be seen in FIG. 5 that when the object-space field angle of the embodiment is 0-15 degrees, the relative illumination (RI) is not lower than 0.92%.

Figure 6:
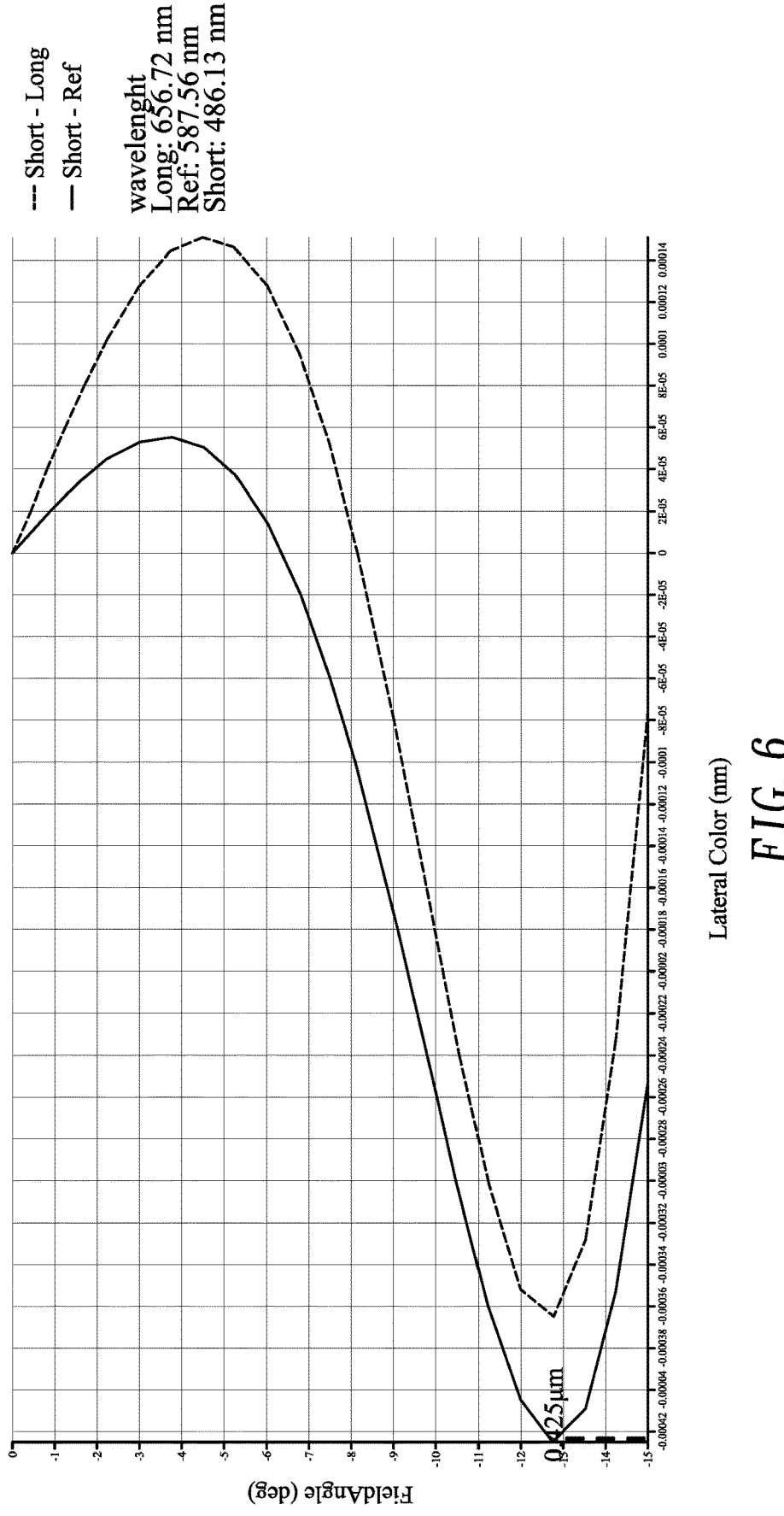
FIG. 6 shows lateral color curves.

FIG. 6 shows lateral color curves of the coupled lens structure 100 for a mixed/augmented reality system. More particularly, FIG. 6 shows a Short-Long (i.e., the Short wavelength minus the Long wavelength) curve and a Short-Ref (i.e., the Short wavelength minus the Ref wavelength) curve of the coupled lens structure 100. The Short-Ref curve in FIG. 6 indicates that the field angle is less than or equal to 1.426 μm while lateral color is in the range from −0.000424 to +0.00014 nm.

The above description is based on only a preferred embodiment of the present invention and is not intended to limit the invention in any way. Although the invention has been disclosed above by way of the preferred embodiment, the embodiment is not intended to limit the invention. A person skilled in the relevant art will recognize that equivalent embodiments can be achieved by modifying, varying, or making equivalent changes to the disclosed embodiment without departing from the scope of the technical solution of the invention. Any simple modification or equivalent change that is made to the above embodiment according to the material contents of the invention shall be regarded as falling within the scope of the technical solution of the invention.

What is claimed is:

1. A coupled lens structure for a mixed/augmented reality system, comprising:
    a lens tube having a lens-tube outer diameter and a lens tube length, the lens tube further having a lens-tube light input surface and a lens-tube light output surface;
    a first lens having a first aspherical light input surface and a first spherical light output surface, wherein the first aspherical light input surface is coupled to the lens-tube light input surface;
    a second lens having a second spherical light input surface and a second aspherical light output surface, wherein the second spherical light input surface is optically coupled to the first spherical light output surface;
    a third lens having a third spherical light input surface and a third spherical light output surface, wherein the third spherical light input surface is optically coupled to the second aspherical light output surface; and
    a fourth lens having a fourth spherical light input surface and a fourth spherical light output surface, wherein the fourth spherical light input surface is optically coupled to the third spherical light output surface, and the fourth spherical light output surface is coupled to the lens-tube light output surface;
    wherein the lens-tube outer diameter and the lens tube length define a volume in a range from 2.1 to 3 cc, and the lens-tube outer diameter is in a range from 12 to 13.5 mm.

2. The coupled lens structure as claimed in claim 1, wherein one of the lenses has an effective diameter greater than or equal to 7.65 mm and less than or equal to 9 mm.

3. The coupled lens structure as claimed in claim 1, wherein the first lens or the second lens is a lens made of a polymer material.

4. The coupled lens structure as claimed in claim 1, wherein the third lens or the fourth lens is a glass lens.

5. The coupled lens structure as claimed in claim 1, further comprising an aperture stop provided between the lens-tube light output surface and the fourth spherical light output surface.

6. The coupled lens structure as claimed in claim 5, wherein the aperture stop has a focal ratio in a range from 1.5 to 2.5.

7. The coupled lens structure as claimed in claim 1, further comprising a protective lens provided between the lens-tube light input surface and the first aspherical light input surface.

8. The coupled lens structure as claimed in claim 7, wherein the protective lens is a planar glass lens.

9. The coupled lens structure as claimed in claim 1, wherein the first lens is a lens with a negative dioptric power value, the second lens is a lens with a positive dioptric power value, the third lens is a lens with a positive dioptric power value, and the fourth lens is a lens with a positive dioptric power value.

10. The coupled lens structure as claimed in claim 1, wherein the coupled lens structure has a full angle of view not greater than 30 degrees.

11. The coupled lens structure as claimed in claim 1, wherein the coupled lens structure has a modulation transfer function (MTF) whose modulation value at a spatial frequency lower than or equal to 85 cycles/mm is greater than or equal to 0.436.

12. The coupled lens structure as claimed in claim 1, wherein optical distortion of the coupled lens structure has an absolute value less than or equal to 0.6%, and TV distortion of the coupled lens structure has an absolute value less than or equal to 1.2%.

13. The coupled lens structure as claimed in claim 1, wherein given an object-space half-field angle of 0-15 degrees, the coupled lens structure has a relative illumination not lower than 0.92%.

\*   \*   \*   \*   \*